Dec. 22, 1936.   L. HLADIK   2,065,224
FRICTIONAL AND POSITIVE CLUTCH MECHANISM
Filed March 6, 1936   2 Sheets-Sheet 1

LADISLAV HLADIK
INVENTOR his Att'y.

Dec. 22, 1936.                L. HLADIK                    2,065,224
                FRICTIONAL AND POSITIVE CLUTCH MECHANISM
                        Filed March 6, 1936         2 Sheets-Sheet 2
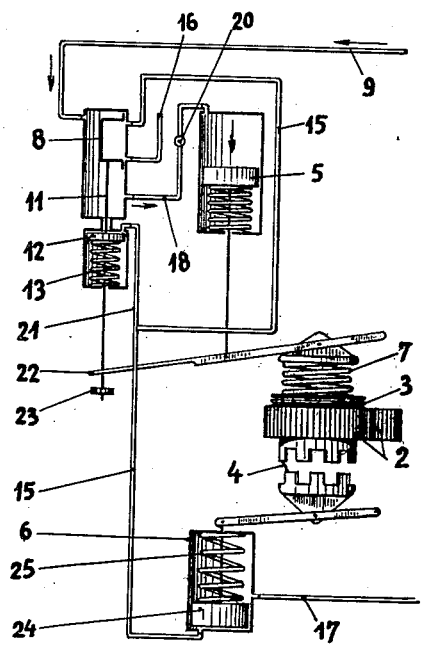
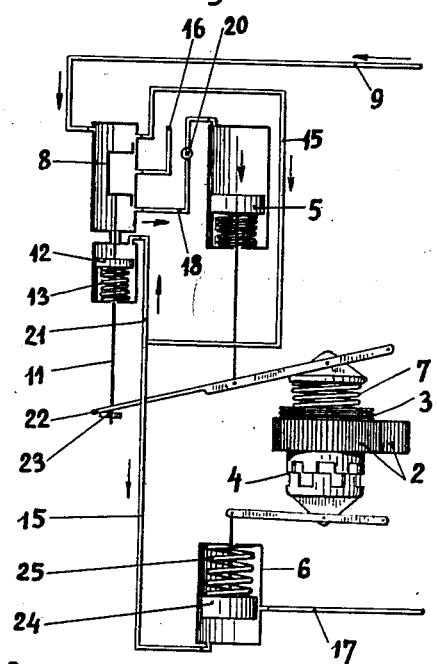
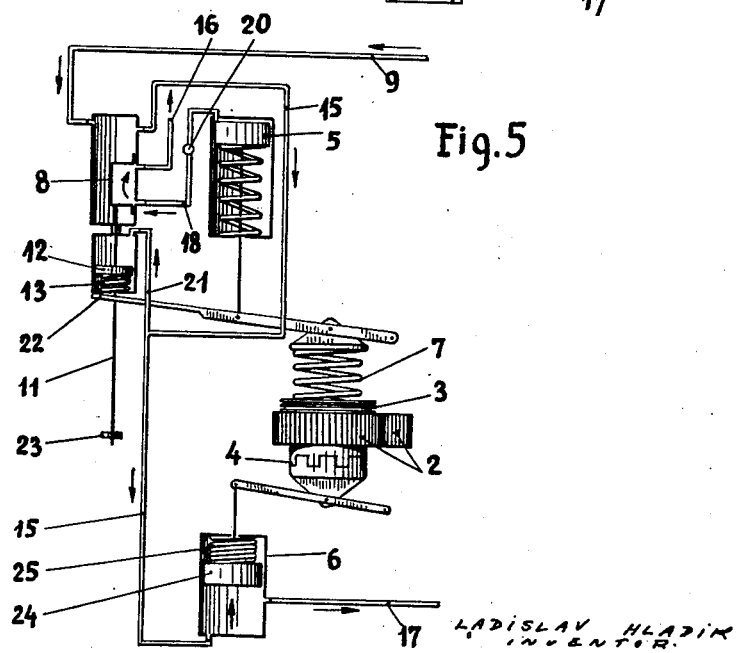

Patented Dec. 22, 1936

2,065,224

UNITED STATES PATENT OFFICE 2,065,224

FRICTIONAL AND POSITIVE CLUTCH MECHANISM

Ladislav Hladik, Pilsen, Czechoslovakia, assignor to Limited Company, formerly the Skoda Works, Plzen, Prague, Czechoslovakia, a corporation of Czechoslovakia Application March 6, 1936, Serial No. 67,483
In Czechoslovakia March 5, 1935

7 Claims. (Cl. 192—53)

This invention relates to an improvement in a frictional and positive clutch mechanism of the type forming part of the device for starting auxiliary engines particularly those of locomotives, according to Patent No. 1,862,362. The invention has for its object an improved and simplified construction of a frictional and positive clutch mechanism in general and of the distributor for the pressure medium in particular, the construction being such that the whole device can easily be built into the narrow space within the frame of the auxiliary engine and increased reliability of operation may be achieved.

A slider may be used in conjunction with an auxiliary cylinder for the control of the pressure medium, which may be air, steam, oil or the like; in this way the relative arrangement and the position of the corresponding or appropriate control conduits and the individual operating positions of the slider when bringing the auxiliary engine into operation, and the movement of the slider from one position to the other, are controlled and carried out so that reliable engagement and disengagement of the claw- and friction-coupling is maintained, which is identical with the procedure according to the Patent No. 1,862,362. The operation of the engagement member takes place entirely automatically and apart from starting the auxiliary engine it is not necessary to give any special attention to the engagement operation.

Figure 1:
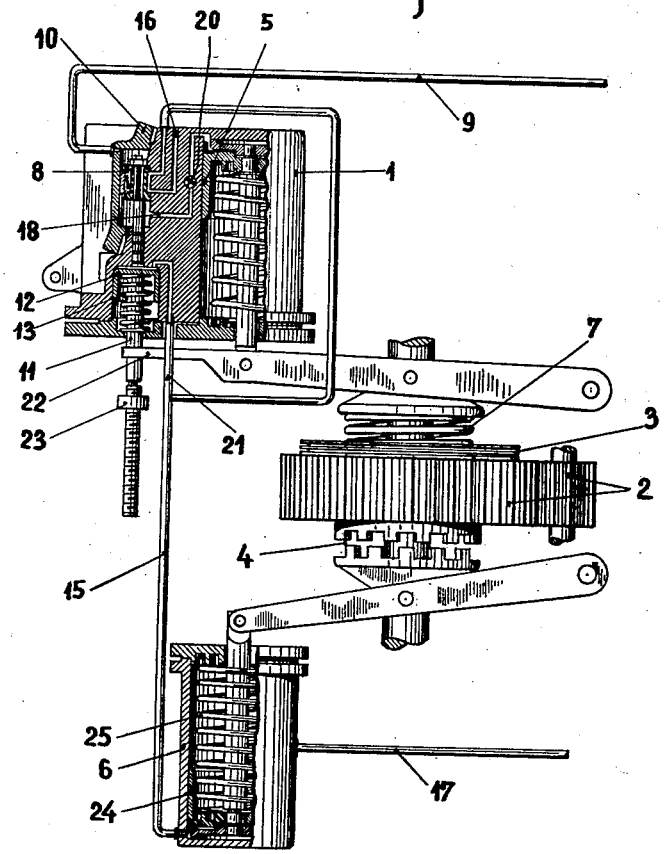
Figure 2:
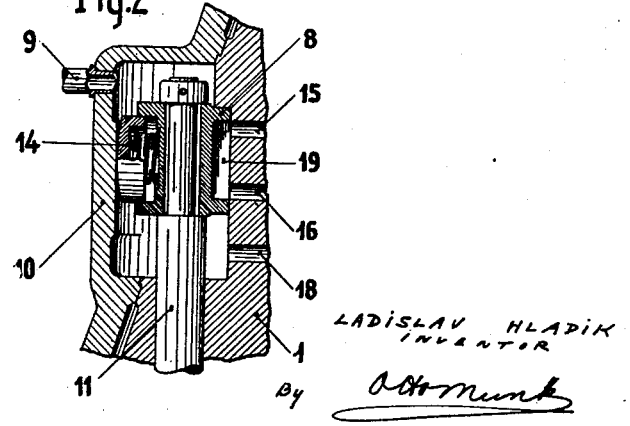

A constructional example of the clutch mechanism according to the invention is illustrated in the accompanying drawings in which Fig. 1 shows a part of the clutch mechanism consisting of the distributor for the pressure medium, the engagement cylinders, and the couplings; the pressure medium distributor and the engagement cylinders being shown in longitudinal section, Fig. 2 illustrates a detail of the pressure medium distributor in section and on a large scale, Figs. 3, 4, and 5 show schematically three characteristic positions of the parts of the clutch mechanism illustrated in Fig. 1.

Fig. 1 shows the pressure medium distributor with the slider 8 in the uppermost position which it occupies during the period while the auxiliary engine is out of engagement and while no pressure medium is in the supply conduit 9 and both couplings, namely the friction-coupling 3 and the claw-coupling 4, are completely disengaged. The slider 8 itself is shown on an enlarged scale in this position in Fig. 2, in which position the couplings 3 and 4 are disengaged.

The auxiliary engine is set in operation by engaging the friction-coupling 3 and the claw-coupling 4. The friction-coupling 3 is controlled by the piston 5 of an operating cylinder for the friction-coupling, by means of a lever transmission and a spring 7. The body 1 of the operating cylinder forms in the example illustrated an integral whole with the body of the pressure medium distributor which includes the slider 8 and the auxiliary cylinder which latter are described below. By this arrangement important advantages are attained, since a body is obtained of considerably smaller size than when they are separately constructed, and thus the whole arrangement is so simplified that the fitting of the same in the narrow confines within the frame of the locomotive booster can be achieved without difficulty. The slider 8 of the distributor proper is mounted in a slider-chamber closed in by a cover 10 and is connected to a piston 12 of an auxiliary cylinder by means of a common connecting or piston-rod 11 this piston being held in the upper position by means of a spring 13. The stroke of the slider 8 is therefore the same as that of the piston 12 of the auxiliary cylinder. The slider 8 is however loosely connected with the piston rod 11 in such a manner that the slider 8 can move perpendicularly to the longitudinal axis of the piston rod and it is pressed continually against the surface of the slider chamber by means of a spring 14. In this way also by making use of the contacting surfaces of the slider and of the surface of the slider-chamber a permanent fluid tightness and consequently also a reliable distribution of the pressure medium is attained. Three conduits 15, 16, 18 open at the surface of the slider-chamber and are controlled by means of the slider 8 through the slider uncovering some of the conduits to permit the pressure medium, supplied by the tubular conduit 9, to flow from the slider-chamber, while said slider, through a recess 19 formed therein, also connects two adjacent conduits together so that the pressure medium may pass from one conduit directly into the other. In the constructional example illustrated, the upper conduit 15 connects the slider-chamber with the operating cylinder 6 of the claw-coupling 4, the centre conduit 16 leads to the atmosphere and the lower conduit 18 leads through a throttle element 20 to the cylinder 4 of the operating cylinder of the friction-coupling 3. From the conduit 15 or from an extension thereof leads a branch 21 to the piston 12 of the auxiliary cylinder.

The throttle element 20 is not a valve or the like which during operation must be actuated or adjusted. The throttle element 20 serves the purpose of throttling the passage of the pressure medium in the channel 18 whereby the retardation of the movement of the piston 5 of the switch-on cylinder of the friction coupling is obtained both during switching-on and switching-off operations of the coupling. Throttle element 20 may be constructed in various ways. Thus for instance this element may consist of a plate provided with a small aperture and disposed in the channel 18.

The cross-sectional area of the channel is determined by means of the member 20 at the time when practical tests are made with the auxiliary engine, the switch-on and switch-off operations being taken into account. The cross-sectional area of the channel remains unchanged during the entire operation of the auxiliary engine.

In the position of the distributor illustrated in Figs. 1 and 2, the slider 8 occupies its upper position. In this position it connects through its recess 19, the conduit 15 which leads to the operating cylinder 6 of the claw-coupling, and the branch 21 thereof which opens into the space in front of the piston 12 of the auxiliary cylinder, directly to the conduit 16 which opens into the atmosphere. The conduit 18 which leads into the space in front of the piston 5 of the operating cylinder of the friction-coupling 3 is not covered over, so that the pressure medium which flows into the slider-chamber through the tubular conduit 9 can flow on through this conduit to the front of the piston 5 of the operating cylinder of the friction-coupling.

The whole device is schematically illustrated in Fig. 3 in the position which it occupies at the moment after starting the locomotive booster, that is to say after the pressure medium has been admitted through the tubular conduit 9 into the chamber of the slider 8. Since the conduit 18 is open the pressure medium flows past the throttle element 20 to the front of the piston 5 of the operating cylinder of the friction-coupling 3 and presses the piston 5 downwards so that the friction-coupling 3 gradually engages under the influence of the lever transmission and the spring 7. In the example illustrated (Fig. 3) the friction-coupling 3 is not yet engaged and the slider 8 is in the uppermost position as before. The conduit 15 which leads to the operating cylinder 6 of the claw-coupling 4 is thus directly connected to the conduit 16 and thereby to the atmosphere and the claw-coupling 4 is completely disengaged. On the piston 5 being further depressed, complete engagement of the friction-coupling 3 takes place and the toothed pinion 2 of the steam engine begins to rotate with the same velocity as the axle of the vehicle or locomotive. In this last phase of the engaging movement of the piston 5, a forked end 22 of the lever transmission strikes against an abutment 23 on the slider or piston-rod 11 and slides the piston 12 of the auxiliary cylinder and thereby also the slider 8 into the mid-position illustrated in Fig. 4. In this position of the slider 8 the conduit 18 still remains uncovered, so that the pressure medium flows on unhindered to the front of the piston 5 and maintains the friction-coupling 3 engaged. The upper conduit 15, however, is opened and thereby the passage of the pressure medium into the operating cylinder 6 of the claw-coupling 4 is permitted, the piston 24 set in movement and the claw-coupling gradually engaged. At the same time, however, the pressure medium forces its way through the branch 21 to the front of the piston 12 of the auxiliary cylinder, the spring 13 in which is of such dimension relative to the spring 25 in the operating cylinder 6 of the claw-coupling 4 and its tension so chosen, that the piston 12 of the auxiliary cylinder and the slider 8 connected therewith begin to move somewhat later than the piston 24 of the operating cylinder 6 of the claw-coupling 4. In this way the result is obtained that before displacement of the slider 8 from the mid-position (Fig. 4) to the lower position (Fig. 5) takes place, the piston 24 of the operating cylinder 6 together with the half of the claw-coupling controlled thereby is in movement, so that the claws of this half of the coupling 4, in the event of their not being exactly opposite the recesses in the other half of the coupling, will rest against the claws of the second half of the coupling as is clear from Fig. 4.

As soon as the controlling pressure medium in front of the piston 12 of the auxiliary cylinder overcomes the pressure of the spring 13, the piston 12 is displaced together with the slider 8 connected therewith from the mid-position (Fig. 4) to the lower position which is shown in Fig. 5. In this position the conduit 16 is directly connected with the conduit 18 by means of the recess 19 in the slider 8 so that the pressure medium gradually leaks from the space in front of the piston 5 of the operating cylinder of the friction-coupling 3 past the throttle element 20 into the outer air and the friction-coupling 3 is gradually disengaged. If at this time both halves of the claw-coupling 4 occupy the position shown in Fig. 4, that is to say, if they rest with their claws against one another, upon partial unloading of the friction coupling 3 a slow relative rotation of both halves of the claw-coupling 4 takes place, and as soon as the claws arrive opposite the recesses the complete engagement of the claw-coupling 4 is brought about by operation of the pressure medium upon the piston 24 of the operating cylinder 6. Thereupon the piston 24 moves into the position illustrated in Fig. 5 and uncovers the conduit 17 through which the pressure medium flows from the operating cylinder 6 of the claw-coupling 4 to further devices not shown in the drawings which form part of the starting device of the locomotive booster. Meanwhile, the pressure medium leaks continually from the space in front of the piston 5 of the operating cylinder of the friction coupling 3 into the atmosphere until complete disengagement of this coupling takes place. This mechanism remains in this position, as illustrated in Fig. 5, during the whole duration of operation of the auxiliary engine.

If the operation of the auxiliary engine is discontinued, that is to say, if the pressure medium is permitted to leave the tubular conduit 9, the pressure medium leaks through this tubular conduit into the atmosphere both from the operating cylinder 6 of the claw-coupling 4 and from the space in front of the piston 12 of the auxiliary cylinder and so on through the branch 21 across the slider-chamber of the slider 8. Consequently, the pressure in the cylinder 6 is reduced and the pistons 24 and 12 assume the positions shown in Fig. 1 under the influence of the corresponding springs 25 and 13, and the claw-coupling is released.

In the example described, it is advantageous to bore all the conduits directly in the body 1 of the operating cylinder of the friction-coupling 3 formed in one piece with the body of the pressure medium distributor proper, that is to say, with the chamber of the slider 8 and the auxiliary cylinder, so that the number of tubes employed is reduced to the smallest possible and only the tubular conduit 15 remains on the operating cylinder 6 of the claw-coupling 4. In this way the whole arrangement is essentially simplified and its reliability is considerably increased in comparison with other arrangements. In the arrangement described the conduit 15 is led round the whole body 1 only for the sake of clearness in the drawings. In practice this conduit also is bored directly in the body 1 proper, a single tubular conduit only leading from the same to the operating cylinder 6. It is obvious that the essence of the invention is in no way altered if this device is carried into practice in a way different from that described and illustrated provided that the essential idea of the invention is retained.

I claim:

1. Clutch mechanism comprising a friction coupling and a claw coupling, pistons and cylinders for operating said couplings by means of a pressure medium and means for distributing said pressure medium including a chamber, means for admitting the pressure medium to said chamber, conduits leading from the chamber to the coupling operating cylinders and a conduit leading from the chamber to atmosphere, a recessed slider within said chamber and adapted to control the emergence of the pressure medium therefrom and a piston and cylinder controlling the movements of the slider, said slider in one extreme position admitting pressure medium to the conduit leading to the friction coupling operating cylinder and placing the conduit leading to the claw-coupling operating cylinder into communication with the conduit open to the atmosphere, in its intermediate position admitting pressure medium to the conduits leading to both the friction and the claw-coupling operating cylinders, and in its other extreme position admitting pressure medium to the conduit leading to the claw-coupling operating cylinder and placing the conduit leading to the friction coupling operating cylinder into communication with the conduit open to the atmosphere.

2. Clutch mechanism as claimed in claim 1, and including a forked lever adapted to be moved by the piston in the cylinder controlling the operation of the friction coupling and operating towards the end of the stroke of said piston to move the slider from its upper position to its intermediate position.

3. Clutch mechanism as claimed in claim 1, and including a conduit adapted to permanently connect the space between the piston and cylinder controlling the movements of the slider, with the conduit leading from the chamber containing the slider to the claw-coupling operating cylinder.

4. Clutch mechanism as claimed in claim 1, and including a conduit adapted to permanently connect the space between the piston and cylinder controlling the movements of the slider, with the conduit leading from the chamber containing the slider to the claw-coupling operating cylinder, and a spring arranged within the slider controlling cylinder and another spring arranged within the claw-coupling controlling cylinder, each spring operating on the piston in its respective cylinder to control the movement of the slider operating piston and cause the movement of the slider from its mid- to its extreme lower position to lag with respect to the movement of the piston in the cylinder effecting the setting of the claw-coupling.

5. Clutch mechanism for the boosters of locomotives comprising a friction coupling and a claw-coupling, pistons and cylinders for operating said couplings by means of a pressure medium and means for distributing said pressure medium including a chamber, means for admitting the pressure medium to said chamber, conduits leading from the chamber to the coupling operating cylinders and a conduit leading from the chamber to the atmosphere, a recessed slider within said chamber and adapted to control the emergence of the pressure medium therefrom, a piston and cylinder controlling the movements of the slider and a common piston rod connecting said piston and slider, said slider in one extreme position admitting pressure medium to the conduit leading to the friction coupling operating cylinder and placing the conduit leading to the claw-coupling operating cylinder into communication with the conduit open to the atmosphere, in its intermediate position admitting pressure medium to the conduits leading to both the friction and the claw-coupling operating cylinders and in its other extreme position admitting pressure medium to the conduit leading to the claw-coupling operating cylinder and placing the conduit leading to the friction coupling operating cylinder into communication with the conduit open to the atmosphere.

6. Clutch mechanism as claimed in claim 1 and comprising a unitary structure including the chamber for the slider, the cylinder for the reception of the piston controlling movements of said slider and the cylinder for the reception of the piston controlling the operation of the friction coupling.

7. Clutch mechanism as claimed in claim 1 and comprising a unitary structure including the chamber for the slider, the cylinder for the reception of the piston controlling movements of said slider, the cylinder for the reception of the piston controlling the operation of the friction coupling and the conduits leading from the chamber for the slider to the said cylinders and to the atmosphere.

LADISLAV HLADIK.